(12) United States Patent
Watanabe et al.

(10) Patent No.: US 9,610,977 B2
(45) Date of Patent: Apr. 4, 2017

(54) STEERING DEVICE, VEHICLE INFORMATION PRESENTATION METHOD, AND NON-TRANSITORY COMPUTER READABLE MEDIUM

(71) Applicant: TOYOTA JIDOSHA KABUSHIKI KAISHA, Toyota-shi, Aichi-ken (JP)

(72) Inventors: Masaya Watanabe, Miyoshi (JP); Yoshiyuki Muramatsu, Aichi-gun (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/886,605

(22) Filed: Oct. 19, 2015

(65) Prior Publication Data

US 2016/0159396 A1     Jun. 9, 2016

(30) Foreign Application Priority Data

Dec. 3, 2014   (JP) .................................. 2014-245152

(51) Int. Cl.
*G06F 7/00*     (2006.01)
*B62D 15/02*    (2006.01)
(Continued)

(52) U.S. Cl.
CPC ............. *B62D 15/029* (2013.01); *B62D 1/04* (2013.01); *B62D 1/046* (2013.01); *B62D 1/06* (2013.01)

(58) Field of Classification Search
CPC .. G05D 1/0061; G05D 1/0214; G05D 1/0055; B62D 15/02; B62D 1/04
(Continued)

(56) References Cited

U.S. PATENT DOCUMENTS

2014/0303827 A1*  10/2014  Dolgov ................. B60W 30/00
                                              701/23
2015/0006014 A1*   1/2015  Wimmer ............... B60W 50/00
                                              701/23
(Continued)

FOREIGN PATENT DOCUMENTS

JP     2001-088577 A    4/2001
JP     2007-022340 A    2/2007
(Continued)

*Primary Examiner* — Thomas G Black
*Assistant Examiner* — Luke Huynh
(74) *Attorney, Agent, or Firm* — Oliff PLC

(57) ABSTRACT

The present disclosure provides a steering device, including: an acquisition section that acquires specific information related to whether or not a driving assistance section, which performs driving assistance processing that assists driving of a vehicle by an occupant, is performing the driving assistance processing; a gripping section that is grippable by the occupant, and that presents information so as to be perceptible to the occupant using an information presentation state that is one of a predetermined first information presentation state or a predetermined second information presentation state; and a controller that controls the gripping section so as to implement the first information presentation state as the information presentation state, and that, based on the specific information acquired by the acquisition section, controls the gripping section such that the information presentation state transitions from the first information presentation state to the second information presentation state.

18 Claims, 14 Drawing Sheets

(51) Int. Cl.
  *B62D 1/04* (2006.01)
  *B62D 1/06* (2006.01)
(58) Field of Classification Search
  USPC .......................................... 701/36, 23, 25, 41
  See application file for complete search history.

(56) References Cited

U.S. PATENT DOCUMENTS

2015/0246686 A1* 9/2015 Takeda .................. B62D 6/008
  701/41
2016/0107655 A1* 4/2016 Desnoyer .............. B60W 50/14
  701/23

FOREIGN PATENT DOCUMENTS

| JP | 2009-001094 A | 1/2009 |
| JP | 2014-106854 A | 6/2014 |

\* cited by examiner

FIG.2
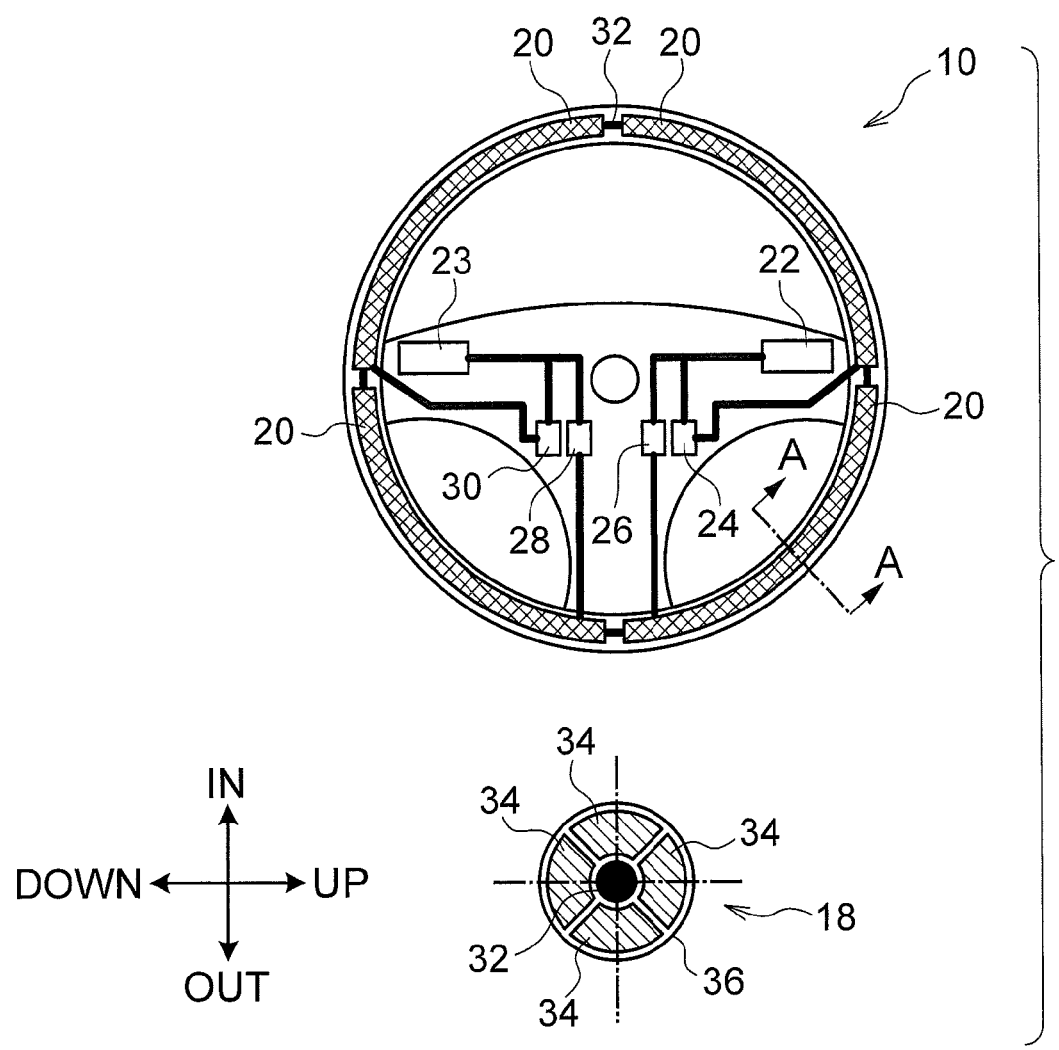
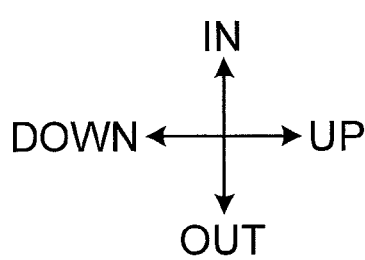

FIG.9

| | | TRAVELLING OPERATION STATE | | | | |
|---|---|---|---|---|---|---|
| | | ORDINARY | TRAVELLING OPERATION STATE ACCOMPANYING END OF DRIVING ASSISTANCE | | | |
| | | | DETECTED | PROCESS (FIRST STAGE) | PROCESS (SECOND STAGE) | COMPLETE |
| VEHICLE | DURING TRAVELLING (AUTOMATIC DRIVING) | — | SWITCH NOTIFICATION | DEGREE OF FREEDOM (FIRST STAGE) | DEGREE OF FREEDOM (SECOND STAGE) | MANUAL DRIVING |
| INFORMATION PRESENTATION STATE | | | START | — | — | COMPLETE |
| STEERING STATE | ORDINARY (AUTOMATIC DRIVING STATE) | | EXPAND AND CONTRACT (REPEATEDLY) | EXPAND | CONTRACT SOMEWHAT | CONTRACT (MANUAL DRIVING STATE) |

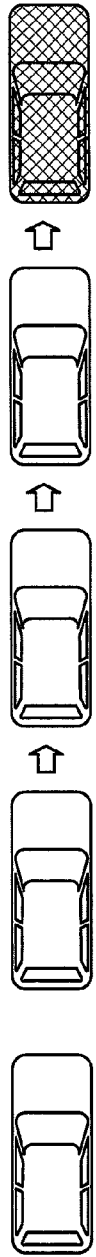

STEERING DEVICE, VEHICLE INFORMATION PRESENTATION METHOD, AND NON-TRANSITORY COMPUTER READABLE MEDIUM

CROSS-REFERENCE TO RELATED APPLICATION

This application claims priority under 35 USC 119 from Japanese Patent Application No. 2014-245152, filed on Dec. 3, 2014, the disclosure of which is incorporated by reference herein.

BACKGROUND

Technical Field

The present disclosure relates to a steering device, a vehicle information presentation method, and a non-transitory computer readable medium storing a vehicle information presentation program.

Related Art

The occupant driving a vehicle steers the vehicle by operating the vehicle steering wheel. In order to transmit information from the vehicle side to the occupant driving the vehicle, a steering device capable of transmitting information to the occupant by imparting stimulus to the hands of the occupant gripping the steering wheel (see, for example, Japanese Patent Application Laid-Open (JP-A) No. 2009-001094), is known. This technology uses stimulus to transmit information to the hands of the occupant for indicating that steering is needed in order to avoid a collision with an obstacle, according to a detection result of detecting vehicle obstacles.

Moreover, in recent years, technology has been realized for assisting driving of a vehicle. As an example of technology that assists driving of the vehicle, in order to increase the safeness of automatic driving control in the vehicle, a device that makes a notification to the occupant prompting disengagement from automatic driving when specific conditions for performing automatic driving are not met during automatic driving of the vehicle (see, for example, JP-A No. 2014-106854, is known.

However, in the technology of JP-A No. 2009-001094 there is a concern that the occupant may confuse the stimulus for information transmissions imparted to the hands with stimulus propagated by the steering wheel from vehicle oscillations generated while travelling, and the information may be overlooked. Moreover, although a notification can be made prompting for disengagement of automatic driving in the technology of JP-A 2014-106854, this is performed during automatic driving of the vehicle, and is insufficient as a case for notifying information from the vehicle side.

As driving assistance technology improves in vehicles, it is conceivable that cases will arise in which the driving authority of the occupant will be entrusted to the vehicle side by the vehicle driving assistance. However, it is preferable for the switch of driving authority to be notified to the occupant by appropriate information in such cases. In cases in which there is insufficient information notification when the vehicle driving assistance entrusts driving authority to the vehicle side from the occupant manually driving, there is a possibility that the occupant will be made to feel apprehensive regarding, for example, inability to confirm whether automatic driving was correctly implemented in the vehicle. Moreover, in cases in which there is insufficient information notification when driving authority is returned from the vehicle side using the driving assistance to the occupant manually driving, there are concerns related to the automatic driving being disengaged by the vehicle side while the occupant remains unprepared for the return to manual driving by the occupant.

SUMMARY

The present disclosure provides a steering device, a vehicle information presentation method, and a non-transitory computer readable medium storing a vehicle information presentation program that may present information relating to vehicle driving assistance so as to be perceivable by an occupant.

A steering device according to a first aspect includes: an acquisition section that acquires specific information related to whether or not a driving assistance section, which performs driving assistance processing that assists driving of a vehicle by an occupant, is performing the driving assistance processing; a gripping section that is grippable by the occupant, and that presents information so as to be perceptible to the occupant using an information presentation state that is one of a predetermined first information presentation state or a predetermined second information presentation state; and a controller that controls the gripping section so as to implement the first information presentation state as the information presentation state, and that, based on the specific information acquired by the acquisition section, controls the gripping section such that the information presentation state transitions from the first information presentation state to the second information presentation state.

According to the first aspect, the specific information is acquired by the acquisition section. The specific information is information related to whether or not driving assistance processing is being performed by the driving assistance section. Information indicating that driving assistance processing performed by the driving assistance section has started, and information indicating that driving assistance processing being performed by the driving assistance section has ended, are examples of the specific information. The gripping section is grippable by the occupant. The gripping section presents information so as to be perceivable by the occupant using an information presentation state out of a predetermined first information presentation state and a predetermined second information presentation state. The controller controls the gripping section such that the first information presentation state is adopted as the information presentation state. Moreover, the controller controls the gripping section such that the second information presentation state is adopted from the first information presentation state as the information presentation state based, on the specific information acquired by the acquisition section. Accordingly, the first aspect enables the specific information, indicating whether or not driving assistance is being performed by the driving assistance section, to be presented so as to be perceptible, and enables the occupant to confirm information from the vehicle side by perceiving the information notified by the gripping section.

According to a second aspect, in the steering device of the above first aspect, as the first information presentation state, an information presentation state is predetermined that indicates a travelling operation state of manual driving by the occupant, and as the second information presentation state, an information presentation state is predetermined that indicates a travelling operation state in which the driving assistance processing is performed by the driving assistance section; and the acquisition section may acquire, as the specific information, information indicating a switch from the travelling operation state of manual driving by the occupant to the travelling operation state in which driving assistance processing is performed by the driving assistance section.

Namely, out of information related to whether or not driving assistance processing is being performed, information indicating a switch of the travelling operation state from manual driving to automatic driving, performed by the driving assistance processing, is acquired as an example of the information indicating that driving assistance processing performed by the driving assistance section has started. Accordingly, the third aspect enables information to be presented to the occupant during a switch from manual driving to automatic driving.

According to a third aspect, in the steering device of the above first aspect, as the first information presentation state, an information presentation state is predetermined that indicates a travelling operation state of manual driving by the occupant, and as the second information presentation state, an information presentation state is predetermined that indicates a travelling operation state in which the driving assistance processing is performed by the driving assistance section; and the acquisition section may acquire, as the specific information, information indicating a switch from the travelling operation state in which driving assistance processing is performed by the driving assistance section to the travelling operation state of manual driving by the occupant.

Namely, out of the information related to whether or not driving assistance processing is being performed, information indicating a switch of the travelling operation state from automatic driving to manual driving is acquired as an example of the information indicating that driving assistance processing being performed by the driving assistance section has ended. Accordingly, the third aspect enables information to be presented to the occupant during a switch from automatic driving to manual driving.

According to a forth aspect, in the steering device of the above aspects, the controller may control the gripping section as the information presentation state by at least one out of changing the shape of the gripping section from a first shape to a second shape, changing the rigidity of the gripping section from a first rigidity to a second rigidity, or oscillating the gripping section from a specific position.

Thus information may be reliably presented to the occupant by at least one out of a shape change of the gripping section, a rigidity change of the gripping section, or oscillation of the gripping section.

According to a fifth aspect, in the steering device of the above second aspect, the acquisition section may further acquire information indicating that a transition has been made to the travelling operation state of manual driving by the occupant; and the controller effects may control such that a steering load on a steering section under manual steering by the occupant is a predetermined specific value, when the acquisition section acquires information indicating that a transition has been made to the travelling operation state of manual driving by the occupant.

Accordingly, the fifth aspect may suppress unease which may be felt by the occupant, and enables smooth transition to manual driving.

According to a sixth aspect, the steering device of the above fifth aspect may further include a grip detection section that detects that the gripping section has been gripped by the occupant, wherein the acquisition section acquires a detection result of the grip detection section as information indicating that a transition has been made to the travelling operation state of manual driving by the occupant.

Thus, transition to a travelling operation state in which the occupant is manually driving may be reliably detected by detecting that the occupant is gripping the gripping section.

A vehicle information presentation method according to a seventh aspect includes: acquiring specific information related to whether or not a driving assistance section, which performs driving assistance processing that assists driving of a vehicle by an occupant, is performing the driving assistance processing; and controlling a gripping section, which is grippable by the occupant and which presents information so as to be perceptible to the occupant using an information presentation state that is one of a predetermined first information presentation state or a predetermined second information presentation state, so as to implement the first information presentation state as the information presentation state, and, based on the acquired specific information, controlling the gripping section such that the information presentation state transitions from the first information presentation state to the second information presentation state.

An eighth aspect is a non-transitory computer readable medium storing a vehicle information presentation program that causes a computer to execute processing, the processing including: acquiring specific information related to whether or not a driving assistance section, which performs driving assistance processing that assists driving of a vehicle by an occupant, is performing the driving assistance processing; and controlling a gripping section, which is grippable by the occupant and which presents information so as to be perceptible to the occupant using an information presentation state that is one of a predetermined first information presentation state or a predetermined second information presentation state, so as to implement the first information presentation state as the information presentation state, and, based on the acquired specific information, controlling the gripping section such that the information presentation state transitions from the first information presentation state to the second information presentation state.

Thus, the occupant seated in the vehicle may also confirm information from the vehicle side by perceiving the information presented by the gripping section using the vehicle information notification method or the vehicle information presentation program.

Accordingly, the above aspects of the present disclosure may present information related to vehicle driving assistance so as to be perceivable by an occupant seated in the vehicle.

Moreover, in the aspects of the present disclosure, unease felt by the occupant may be suppressed and may enable smooth transition to manual driving, when transiting from driving assistance processing to manual driving by the occupant, in a case in which steering load on the steering section is controlled.

BRIEF DESCRIPTION OF THE DRAWINGS

Exemplary embodiments will be described in detail based on the following figures, wherein:

FIG. 2 is a block diagram illustrating a configuration including a steering wheel interior;

FIG. 9 is an explanatory diagram illustrating changes to a state of a rim;

DETAILED DESCRIPTION

Detailed explanation follows regarding exemplary embodiments of the present disclosure with reference to the drawings.

[First Exemplary Embodiment]

Figure 1:
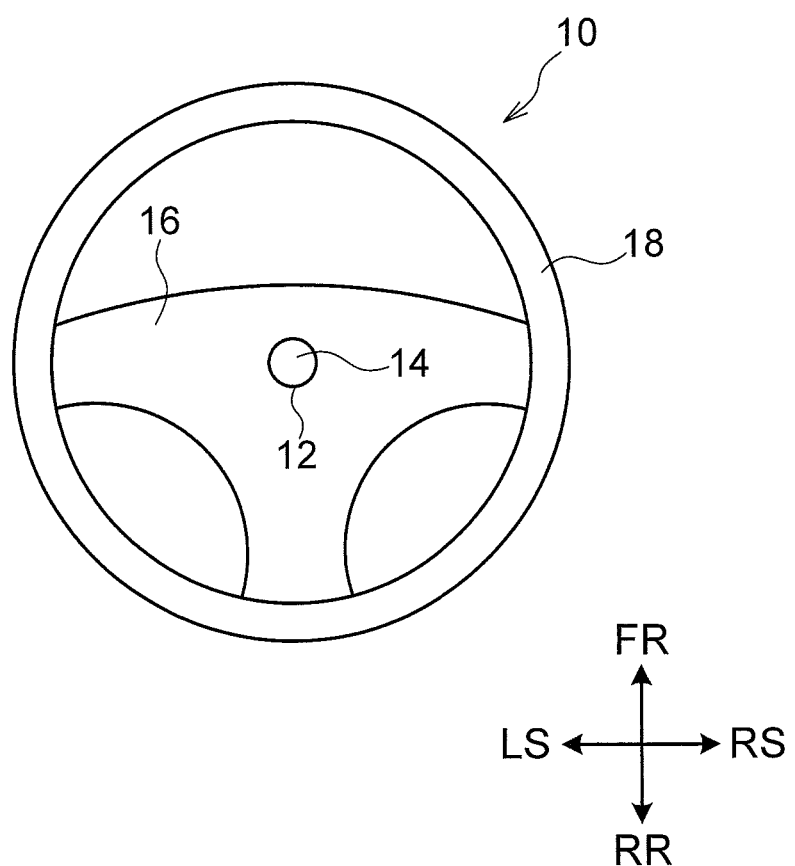
FIG. 1 is an elevation view illustrating a configuration of a steering wheel according to a first exemplary embodiment.

FIG. 1 illustrates an example of a configuration of a steering wheel 10 according to an exemplary embodiment configured applied with a steering device of the present disclosure. In FIG. 1, the arrow FR, the arrow RR, the arrow RS, and the arrow LS respectively indicate the vehicle front-rear direction front side, the vehicle front-rear direction rear side, the vehicle width direction right side, and the vehicle width direction left side.

The steering wheel 10 includes a boss 12, and the boss 12 is disposed on a central portion of the steering wheel 10. A vehicle rear side end (upper end) of a circular shaft shaped steering shaft 14, serving as an operation shaft, is fixed to the boss 12, and the steering wheel 10 is rotatable as a unit with the steering shaft 14, with the steering shaft 14 serving as a central axis.

A spoke section 16 is fixed to the end portion (upper end) of the steering shaft 14, and the spoke section 16 extends from the boss 12 toward the radial direction outside of the steering wheel 10, and is rotatable as a unit with the boss 12.

A circular ring shaped rim 18, serving as a gripping section (outer circumferential portion), is fixed to leading ends of the spoke section 16, and the rim 18 is disposed along the circumferential direction of the steering wheel 10 (the length direction of the rim 18) such that the central axis thereof is aligned with the central axis of the steering shaft 14, and the rim 18 is rotatable as a unit with the boss 12 and the spoke section 16. The rim 18 is grippable by the hands of an occupant (for example, also referred to as the driver hereafter), and in a state in which the rim 18 is gripped by the hands of the occupant, the steering shaft 14 is rotated to steer the vehicle by rotation operation of the steering wheel 10.

FIG. 2 illustrates an example of an internal configuration including relevant elements mounted to the steering wheel 10. FIG. 2 also illustrates a cross-section illustrating a cross-section A-A of the rim 18. In FIG. 2, the arrow IN, the arrow OUT, the arrow UP, and the arrow DOWN respectively indicate the steering wheel inner-outer direction inside, the steering wheel inner-outer direction outside, the steering wheel up-down direction upper side, and the steering wheel up-down direction lower side in the cross-section.

A substantially circular pillar shaped steering wheel core member 32 (steering wheel base member), serving as a core member made from urethane, wood, or the like, is provided to the rim 18. The steering wheel core member 32 is disposed around the entire circumferential direction of the steering wheel 10. Plural steering wheel bags 20 are provided at the periphery of the steering wheel core member 32, and the plural steering wheel bags 20 are disposed at equal intervals around the entire circumferential direction of the steering wheel 10. In the present exemplary embodiment, the steering wheel bags 20 include plural small bags 34. The plural small bags 34 are provided at the steering wheel inner-outer direction inside, the steering wheel inner-outer direction outside, the steering wheel up-down direction upper side, and the steering wheel up-down direction lower side. The steering wheel bags 20 are respectively provided to the upper right side, the lower right side, the lower left side, and the upper left side of the steering wheel 10 around the circumferential direction of the steering wheel 10. The small bags 34 are each configured so that the interior thereof is finable with fluid, and so that the capacity or rigidity thereof may be changed (as described in detail below).

The steering wheel core member 32, and the steering wheel bags 20 provided with the plural small bags 34, are housed in a substantially circular pillar shaped steering wheel outer circumferential member 36, serving as an outer circumferential member made from urethane or the like.

Pumps 22, 23, serving as a fluid inflow/outflow driving means, are provided inside the spoke section 16. An inlet/outlet of the pump 22 is in communication with a switching valve (an upper right bag switching valve) 24 that handles switching between inflow and outflow of fluid to and from the small bags 34 included in the steering wheel bag 20 at the upper right side of the steering wheel 10. The switching valve 24 of the upper right bag is capable of switching between inflow and outflow of fluid to and from each of the small bags 34 included in the steering wheel bag 20 at the upper right side of the steering wheel 10 independently. The inlet/outlet of the pump 22 is also in communication with a switching valve (lower right bag switching valve) 26 that handles switching between inflow and outflow of fluid to and from the small bags 34 included in the steering wheel bag 20 at the lower right side of the steering wheel 10. The lower right bag switching valve 26 is also capable of switching between inflow and outflow of fluid to and from each of the small bags 34 included in the steering wheel bag 20 at the lower right side of the steering wheel 10 independently.

Similarly, the inlet/outlet of the pump 23 is in communication with a switching valve (lower left bag switching valve) 28 that handles switching between inflow and outflow of fluid to and from the small bags 34 included in the steering wheel bag 20 at the lower left side of the steering wheel 10, and with a switching valve (upper left bag switching valve) 30 that handles switching between inflow and outflow of fluid to and from the small bags 34 included in the steering wheel bag 20 at the upper left side of the steering wheel 10.

The pumps 22, 23, and the switching valves 24, 26, 28, 30 are connected to a control device 40 (FIG. 4), and the control device 40 (FIG. 4) controls driving of the pumps and operation of the switching valves.

Figure 3:
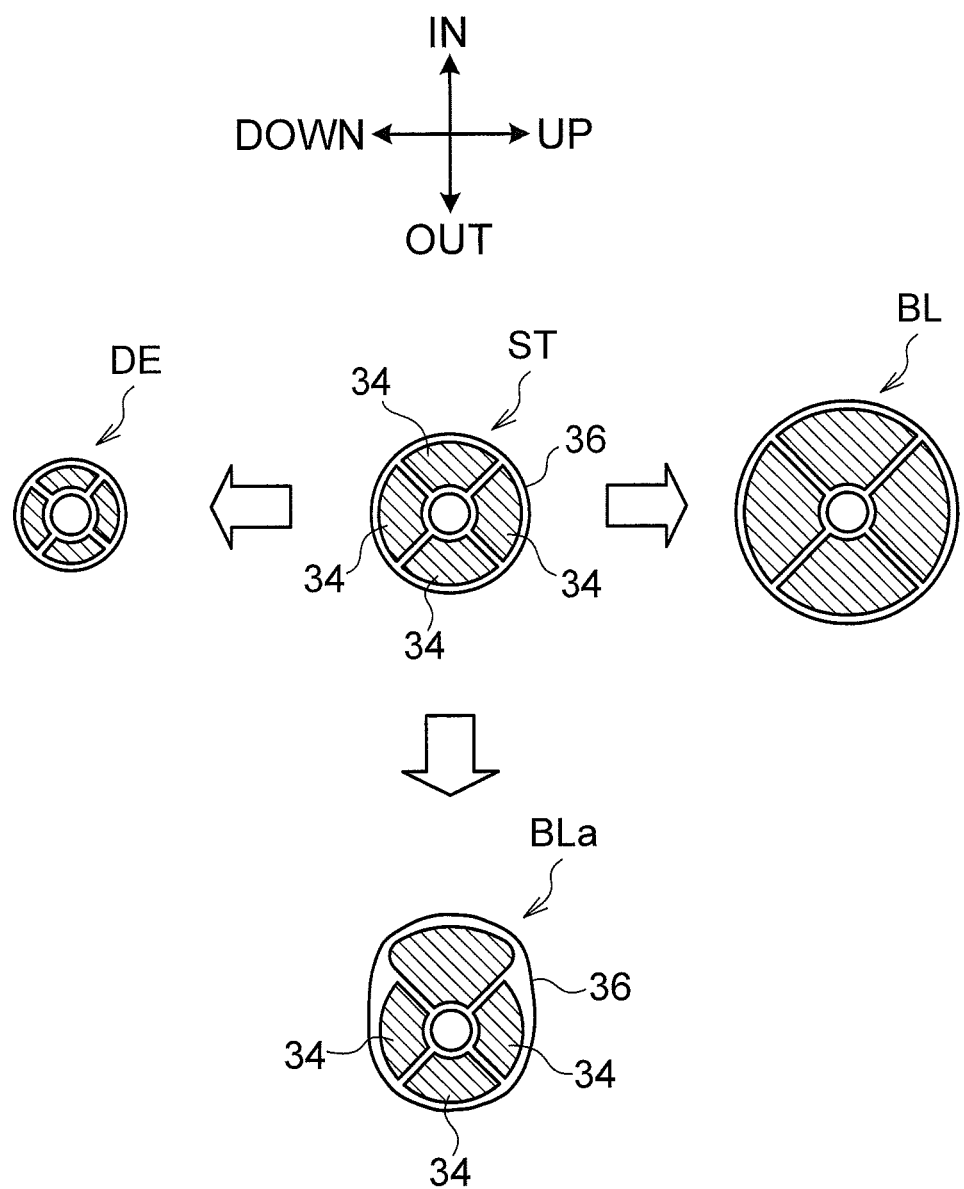
FIG. 3 is an explanatory diagram illustrating states of a rim.

FIG. 3 illustrates an example of a situation in which a state of the rim 18 is changed by driving of the pumps and operation of the switching valves. Initially and during normal operation, the pumps are driven and the switching valves are operated to set a shape of the rim 18 having a specific diameter, in which the rim 18 is in a predetermined standard state ST. From the standard state ST, the pumps 22, 23 are driven and each of the switching valves 24, 26, 28, 30 are operated such that fluid is supplied to each of the steering wheel bags 20, thereby setting the shape such that the rim 18 has an increased diameter, in which the rim 18 is in an expanded state BL.

From the standard state ST, the pumps 22, 23 can be driven and the switching valves 24, 26, 28, 30 can each be operated such that each of the steering wheel bags 20 is independently supplied with fluid, and the shape of the rim 18 is thereby set to a shape in which diameter of the rim 18 is increased in some directions only. For example, as illustrated in FIG. 3, supplying fluid to only the small bag 34 at the steering wheel inner-outer direction inside included in the steering wheel bag 20 at the steering wheel inner-outer direction inside enables an expanded state BLa to be set in which the steering wheel bag 20 is expanded toward the steering wheel inner-outer direction inside.

Moreover, from the standard state ST, driving the pumps 22, 23 and operating each of the switching valves 24, 26, 28, 30 such that fluid is expelled from each of the steering wheel bags 20 enables the shape to be set such that the rim 18 has a decreased diameter, in which the rim 18 is in a contracted state DE.

In the present exemplary embodiment, although explanation has been given of a case in which the shape of the rim 18 is changed as an example of a state change of the rim 18, configuration may be made such that the rigidity of the rim 18 is changed. For example, rigid states corresponding to each out of the expanded state BT, the standard state ST, and the contracted state DE may be obtained by changing the amount or properties of fluid inflowing to or outflowing from the steering wheel bags 20 without changing the diameter of the rim 18.

Figure 4:
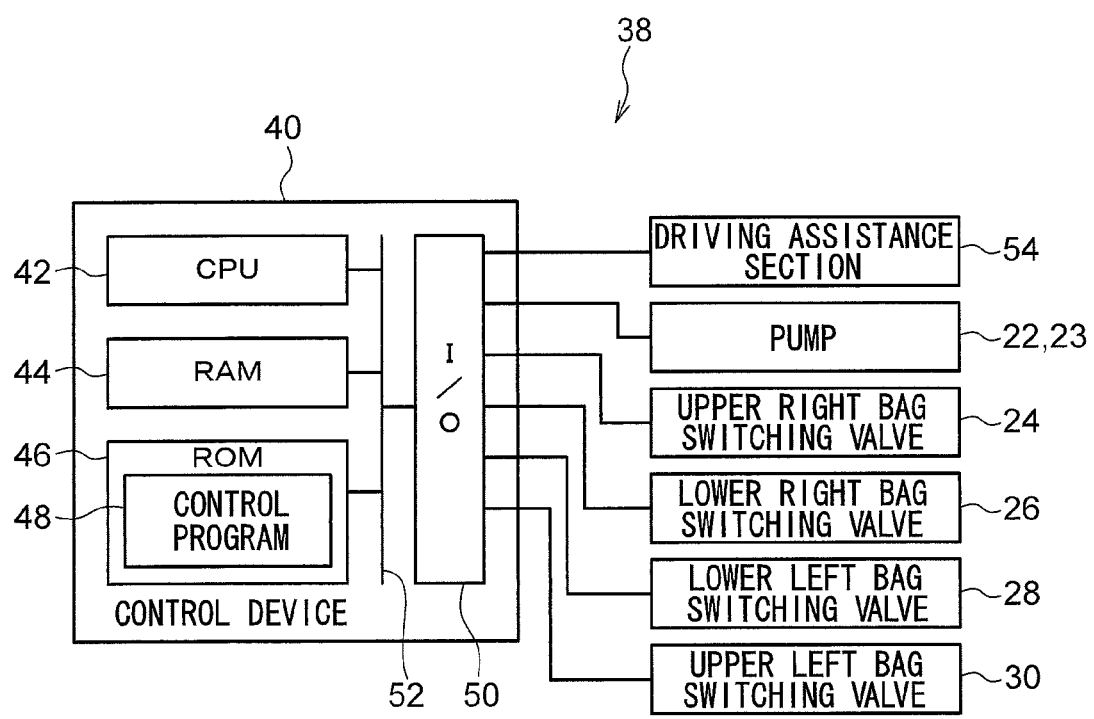
FIG. 4 is a block diagram illustrating a configuration of an on-board machine including a control device.

FIG. 4 illustrates an example of a configuration of an on-board machine 38 including the control device 40 that controls driving of the pumps 22, 23 and operation of each of the switching valves 24, 26, 28, 30. As illustrated in FIG. 4, the control device 40 includes a CPU 42, RAM 44, ROM 46 serving as a non-volatile storage section that stores a control program 48, and an input/output interface (I/O) 50 that communicates with external devices, and these components are connected to one another through a bus 52. A driving assistance section 54 that includes an automatic steering system, the pumps 22, 23, and the valves 24, 26, 28, 30 are connected to the I/O 50.

The driving assistance section 54 performs driving assistance processing such as steering actions that assist driving of the vehicle by the driver. Moreover, the driving assistance section 54 stores information indicating a travelling operation state of the vehicle, and can output the stored information indicating the travelling operation state of the vehicle. The information indicating the travelling operation state of the vehicle is information indicating a manual driving state in which the vehicle is manually driven by the driver, or information indicating an automatic driving state in which driving of the vehicle by the driver is assisted by the driving assistance section 54.

The driving assistance section 54 also outputs specific information related to vehicle driving assistance. Information indicating that driving assistance processing has started, and information indicating that driving assistance processing has ended, are examples of the specific information.

For example, during manual driving, the driving assistance section 54 can assist driving of the vehicle by starting driving assistance processing that uses automatic steering actions or the like according to the behavior of the vehicle and the surrounding situation. In such cases, the driving assistance section 54 outputs information indicating the start of driving assistance processing. Moreover, as driving assistance technology improves in vehicles, in cases in which the driving authority of the vehicle is to be entrusted to the vehicle side, namely, in cases in which, under instruction from the driver, a switch is made from manual driving to automatic driving, the driving assistance section 54 outputs information indicating a transition of driving authority, namely, the specific information that is information indicating the start of driving assistance processing.

The driving assistance section 54 can perform processing to prompt manual driving of the vehicle by the driver by automatically ending (disengaging) driving assistance processing, according to the behavior of the vehicle and the surrounding situation during execution of driving assistance processing. In such cases, the driving assistance section 54 outputs information indicating the end of driving assistance processing in order to prompt manual driving of the vehicle by the driver. Moreover, as driving assistance technology improves in vehicles, in cases in which the driving authority of the vehicle is to be returned to the driver from the vehicle side, namely, in cases in which, under instruction by the driver or as an automatic action by the driving assistance section 54, a switch is made from automatic driving by the driving assistance processing to manual driving, the driving assistance section 54 outputs information indicating a transition in driving authority, namely, the specific information that is information indicating the end of driving assistance processing.

The driving assistance section 54 may be provided with communications equipment that receives peripheral information by exchange of information between the vehicle and the vehicle exterior. Examples of communications equipment include communications equipment that receive the road situation using road-to-vehicle communications, such as wireless communications equipment by dedicated short range communications (DSRC). Moreover, information indicating peripheral information, such as the road situation received by road-to-vehicle communications, includes, for example, the shape and situation of a vehicle lane or road such as the curvature and road cant of the vehicle lane being traveled, a positional relationship between the vehicle and the vehicle lane, and information indicating a positional relationship with other travelling vehicles and the surrounding traffic density and the like. The driving assistance section 54 may include a navigation system as an example of a machine for obtaining peripheral information.

The control program 48 is read from the ROM 46 and expanded into the RAM 44, and the control device 40 functions as a steering wheel device controller of the present disclosure by the CPU 42 executing the control program 48 that has been expanded into the RAM 44.

Note that the on-board machine 38 is an example of a steering device according to the present disclosure. The control device 40 is an example of an acquisition section and a controller according to the present disclosure, and the steering wheel 10 is an example of a gripping section according to the present disclosure.

Figure 5:
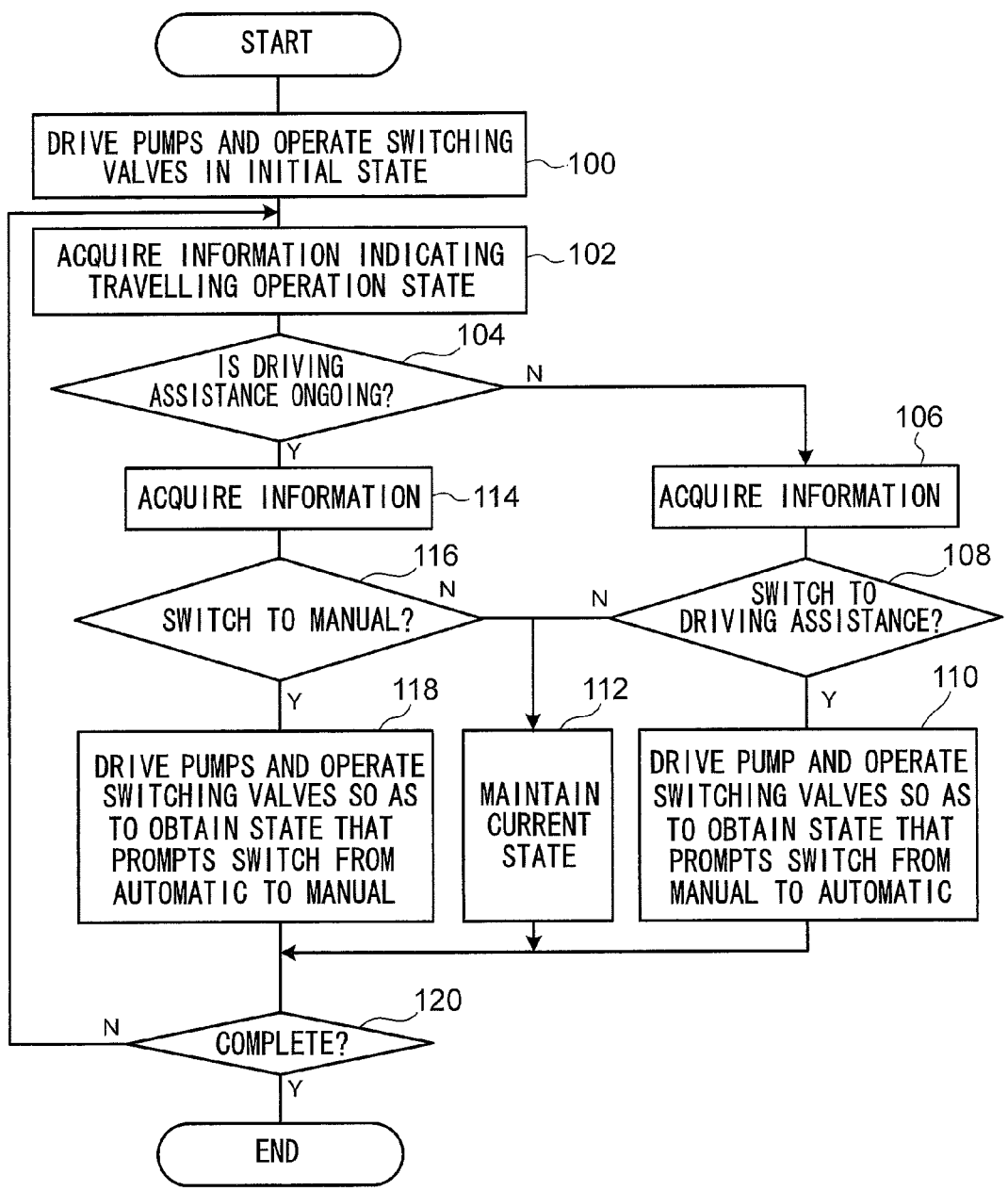
FIG. 5 is flowchart illustrating a flow of control processing.

Explanation next follows regarding processing executed by the control device 40 of the vehicle mounted with the on-board machine 38 with reference to the flowchart illustrated in FIG. 5, as operation of the present exemplary embodiment. The information presentation control processing illustrated in FIG. 5 is executed when the ignition switch is turned ON by the driver. The information presentation control processing is continuously executed while the ignition switch is ON.

At step 100, the control device 40 reads a setting value indicating the initial state of the rim 18 from the ROM 46 as an initial setting, and controls driving of the pumps 22, 23 and operation of each of the switching valves 24, 26, 28, 30. In the present exemplary embodiment, when the ignition switch is switched ON, the travelling operation state by manual driving is predetermined, and the standard state ST is predetermined as the initial state of the rim 18. The ROM 46 is stored with a driving value for the pumps 22, 23 and operation values for each of the switching valves 24, 26, 28, 30 serving as setting values for the standard state ST set for the rim 18 to obtain a rim 18 shape (diameter) appropriate for manual driving.

Next, at step 102, the control device 40 acquires information indicating the travelling operation state from the driving assistance section 54, and at the next step 104, determines whether or not vehicle assistance is in progress. Since the initial setting made at step 100 is a travelling operation state using manual driving, negative determination is made at step 104, and processing proceeds to step 106. At step 106, information output from the driving assistance section 54 is acquired, and at the next step 108, determination is made as to whether or not the acquired information is specific information related to the driving assistance processing of the vehicle, namely, information indicating a switch from manual driving by the driver to automatic driving. Information indicating a switch from manual driving by the driver to automatic driving includes the fact that information indicating the start of driving assistance processing has been acquired. Namely, the determination of step 108 is determination as to whether or not there exists information indicating the start of driving assistance processing by the driving assistance section 54 during manual driving of the vehicle by the driver, or is determination as to whether or not there exists information indicating a transition, under driver instruction, in driving authority from manual driving by the driver to automatic driving.

When negative determination is made at step 108, the control device 40 transitions processing to step 112, and controls driving of the pumps 22, 23 and operation of each of the switching valves 24, 26, 28, 30 such that the current state is maintained.

However, when affirmative determination is made at step 108, the control device 40 transitions processing to step 110, and controls driving of the pumps 22, 23 and operation of each of the switching valves 24, 26, 28, 30 so as to implement a state prompting the transition from manual driving by the driver to automatic driving.

Figure 6:
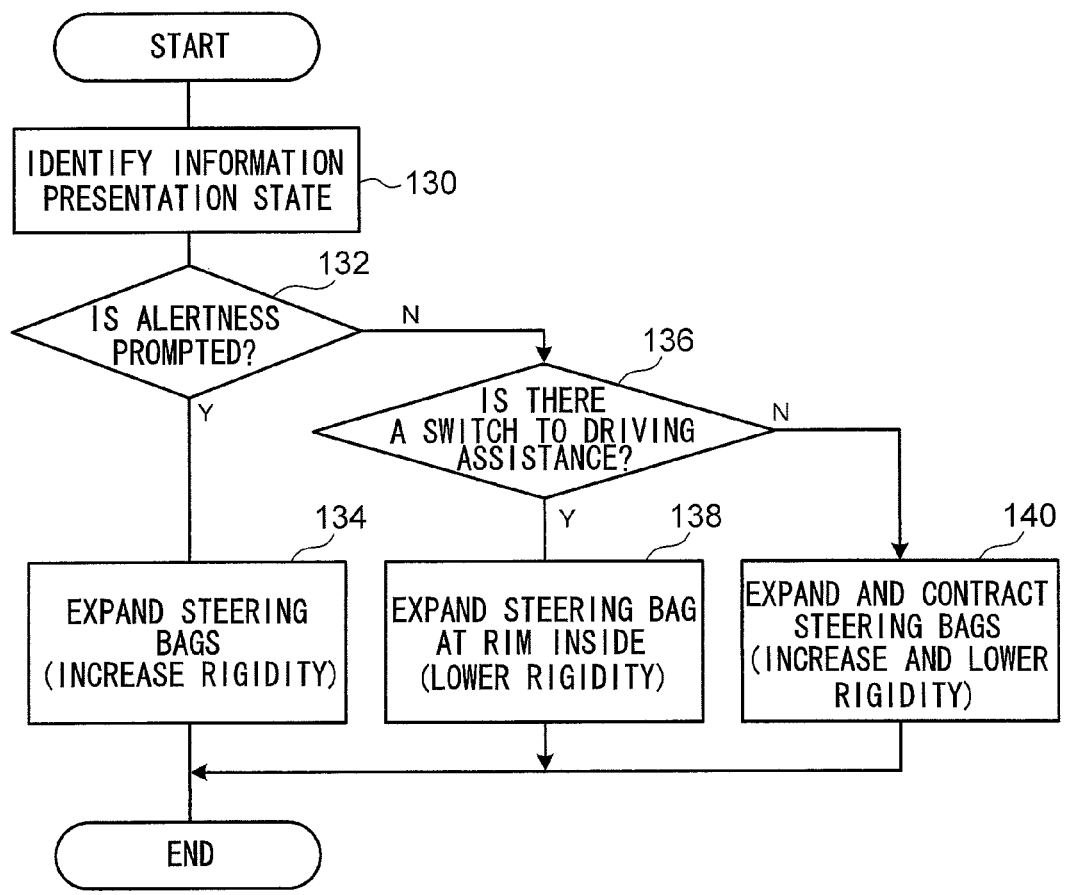
FIG. 6 is a flowchart illustrating a flow of state setting processing of a rim.

FIG. 6 illustrates an example of a flow of processing at step 110 (processing that sets the rim 18 state) in detail. First, at step 130, the control device 40 identifies the information presentation state from the information acquired at step 106 illustrated in FIG. 5. Namely, the information presentation state is identified based on the specific information. In the present exemplary embodiment, identification of a state prompting alertness to the driver in a case in which driving assistance processing starts, a state prompting the switch to automatic driving, and other states are examples of information presentation states identified at step 130.

First, at step 132, the control device 40 determines whether or not the identified information presentation state is a state prompting alertness in the driver at the start of driving assistance processing, and processing proceeds to step 134 in cases in which affirmative determination is made. At step 134, the steering wheel bag 20 is expanded and information presentation is performed. At step 134, driving of the pumps 22, 23 and operation of each of the switching valves 24, 26, 28, 30 are controlled so as to obtain a shape in which the diameter of the rim 18 is increased. Namely, the control device 40 controls the pumps 22, 23 and the switching valves 24, 26, 28, 30 such that fluid is supplied to each of the steering wheel bags 20 of the rim 18 and a change is made from the standard state ST to the expanded state BL. Note that the control device 40 may be configured to increase the rigidity of the rim 18.

In this manner, the driver may be caused to perceive the information by expanding the steering wheel bag 20 and thereby increasing the diameter of the rim 18 gripped by the driver. For example, the driver may be caused to perceive a change of state from the standard state ST, and alertness may be prompted to the driver, by increasing the diameter of the rim 18. Moreover, alertness may be prompted in the driver by increasing the rigidity of the rim 18. Moreover, by increasing the diameter of the rim 18 up to a state that is difficult for the driver to grip, the rim 18 may be made difficult for the driver to grip, and a prompt may be made for the driver to release their grip on the steering wheel.

In a case in which negative determination is made at step 132, at step 136, the control device 40 determines whether or not there is a state prompting the switch to automatic driving, and processing proceeds to step 138 in cases in which affirmative determination is made. At step 138, information presentation is performed by expanding a portion of the steering wheel bag 20. At step 138, driving of the pumps 22, 23 and operation of some of the switching valves 24, 26, 28, 30 is controlled so as to obtain a shape in which the diameter of the rim 18 is increased at a portion thereof. Namely, the control device 40 controls the pumps 22, 23 and the switching valves 24, 26, 28, 30 such that the state of the rim 18 changes from the standard state ST to the expanded state BLa (FIG. 3). More specifically, from out of all of the steering wheel bags 20, fluid is supplied to only the small bag 34 at the steering wheel inner-outer direction inside, and the steering wheel bag 20 is expanded in the steering wheel inner-outer direction inside direction. Note that the control device 40 may be configured to lower the rigidity of a portion of the rim 18 (at the steering wheel inner-outer direction inside).

Expanding a portion of the steering wheel bag 20 in this manner enables the driver to be caused to perceive information using a state that differs from states in which the entire steering wheel bag 20 is expanded. Namely, expanding the small bags 34 at the steering wheel inner-outer direction inside enables perception to be imparted to the driver from part of the steering wheel 10, and enables the driver to be prompted to release their grip on the steering wheel 10. Although explanation has been given above of a case in which a portion of the steering wheel bag 20 is expanded, a portion of the steering wheel bag 20 may contract to cause the driver to perceive a state differing from the standard state ST.

In a case in which negative determination is made at step 136, the control device 40 proceeds to step 140 to implement a state other than those above. At step 140, the steering wheel bag 20 is expanded and information presentation is performed. At step 140, driving of the pumps 22, 23 and operation of the switching valves 24, 26, 28, 30 are controlled such that the shape of the diameter of the rim 18 is intermittently increased and decreased. Note that the control device 40 may be configured to raise or lower the rigidity of the rim 18.

In this manner, information may be presented to the driver using a state differing from those described, by expanding and contracting the steering wheel bag 20.

In a case in which information is presented to the driver as described above, at least some of the small bags may be gradually expanded and contracted from a partway expanded state in stages, so as to change the state of the steering wheel bag 20 in a manner easily perceived by the driver.

Figure 7:
FIG. 7 is an explanatory diagram illustrating changes to a state of a rim.

FIG. 7 illustrates an example of a specific process for performing information presentation to the driver (step 110). FIG. 7 illustrates how the travelling operation state relates to the vehicle, the information presentation state, and the state of the steering wheel when driving assistance processing starts during manual driving by the driver. Specifically, a case is illustrated in which, during manual driving by the driver, a broken down vehicle in front of the vehicle itself is detected, and driving assistance processing that stops the vehicle itself is started.

In a case in which the driver is driving the vehicle manually, the rim 18 is set to a state in which the shape of the rim 18 has a specific diameter according to the standard state ST. In a case in which a broken down vehicle is detected in front of the vehicle by the vehicle itself, information presentation by the rim 18 is started, and transition is made from the standard state ST to the expanded state BL. In such cases, the expanded state BL transitions to a weakly expanded state BL since the broken down vehicle is being detected. In a midway process after the broken down vehicle detection, information presentation is performed to prompt promotion of caution in the driver (indicating that the broken down vehicle in front of the vehicle itself has stopped). Namely, at the first stage that is a process stage following broken down vehicle detection, expansion and contraction are repeated from the expanded state BL, and at a second stage that is a process stage at which driving assistance processing, in which the vehicle brakes automatically, is started, transition is made to the expanded state BL. At the second stage, transition is made to a strongly expanded state BL in order to accompany the braking of the vehicle itself. Then, in a case in which the vehicle itself stops, information presentation by the rim 18 ends, the shape of the rim 18 contracts, and is returned to the standard state ST.

As illustrated in FIG. 5, in a case in which driving assistance processing such as steering actions that assist driving of the vehicle by the driver are performed, namely, in a case in which driving assistance is in progress, the control device 40 makes affirmative determination at step 104, and processing proceeds to step 114. Similarly to the processing of step 106, at step 114, information output from the driving assistance section 54 is acquired, and at the next step 116, determination is made as to whether or not the acquired information is specific information related to driving assistance of the vehicle, namely, information indicating a switch from automatic driving to manual driving by the driver. Examples of specific information related to driving assistance of the vehicle, this being information indicating a switch from automatic driving to manual driving by the driver, include information output from the driving assistance section 54 in cases in which the driving assistance section 54 has determined that it would be difficult to continue driving assistance processing such as steering actions due to road conditions or the like, or in cases in which the driving assistance section 54 has determined that manual driving is preferable over automatic driving due to approaching an urban area. The information output when, for example, an instruction to switch from automatic driving to manual driving is made by the driver, may be specific information related to driving assistance of the vehicle.

In a case in which negative determination is made at step 116, the control device 40 transitions processing to step 112.

However, in a case in which affirmative determination is made at step 116, the control device 40 transitions processing to step 118, and controls driving of the pumps 22, 23 and each of the switching valves 24, 26, 28, 30 such that a state is implemented that prompts switching from automatic driving to manual driving.

Figure 8:
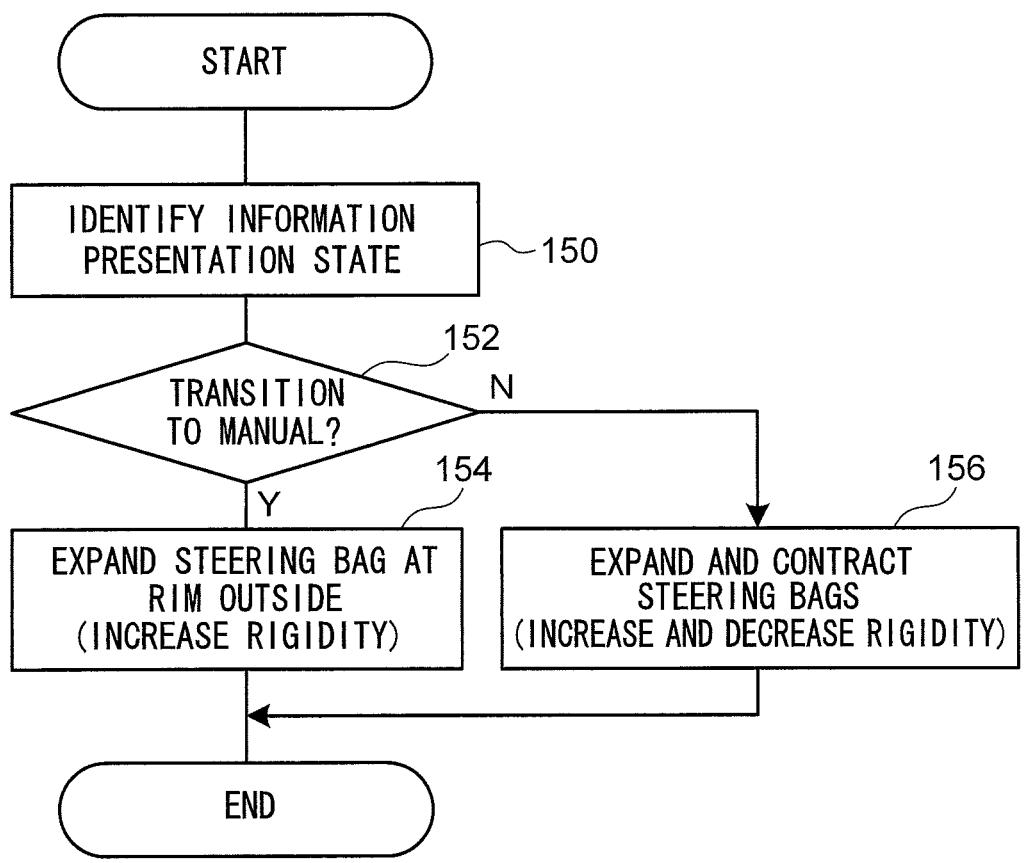
FIG. 8 is a flowchart illustrating a flow of state setting processing of a rim.

FIG. 8 illustrates an example of a flow of processing of step 118 in detail. First, at step 150, the control device 40 identifies the information presentation state from the information acquired at step 114 illustrated in FIG. 5. Namely, the information presentation state is identified based on the specific information. In the present exemplary embodiment, examples of the information presentation state identified at step 130 include states prompting the switch from automatic driving to manual driving by the driver, and states other than this.

At step 152, the control device 40 determines whether or not the identified information presentation state is a state prompting the switch from automatic driving to manual driving by the driver, and in a case in which affirmative determination is made, processing proceeds to step 154. At step 154, the steering wheel bag 20 is expanded, and information presentation is performed. Similarly to in step 134, at step 154, driving of the pumps 22, 23 and operation of the switching valves 24, 26, 28, 30 are controlled so as to obtain a shape in which the diameter of the rim 18 is increased (a change from the standard state ST to the expanded state BL). Note that the control device 40 may be configured to increase the rigidity of the rim 18.

In a case in which driving assistance processing is being performed (during driving assistance), there is a possibility that the driver is in an inattentive state due to relying on the automatic driving by the driving assistance processing. Thus, during driving assistance, information presentation is performed using a state prompting the switch from automatic driving to manual driving by the driver by expanding the steering wheel bag 20, enabling the driver to recognize information visually, and enabling the driver to recognize information by sense of touch in cases in which the driver is gripping the steering wheel 10. Accordingly, a smooth switch from automatic driving to manual driving by the driver is enabled.

Moreover, in a case in which negative determination is made at step 152, the control device 40 transitions processing to step 156 that is similar to step 136 and implements a state other than those described above. In this manner, information can be displayed to the driver by the state differing from those above, by expanding and contracting the steering wheel bag 20.

FIG. 9 illustrates a specific example of the process that performs information presentation to the driver (step 118). FIG. 9 illustrates how the travelling operation state relates to the vehicle, the information presentation state, and the state of the steering wheel when the switch is made to manual driving by the driver during automatic driving started by the driving assistance processing.

During automatic driving started by the driving assistance processing, the rim 18 is set to a shape in which the rim 18 has a specific diameter using the contracted state DE. In a case in which information is detected that prompts the switch from automatic driving to manual driving by the driver (a switch notification), information presentation that uses the rim 18 is started, and the state is repeatedly transitioned from the contracted state DE to the expanded state BL and the contracted state DE. In a midway process after the detection of the switch notification, information presentation is performed that prompts promotion of caution in the driver (prompts the switch from automatic driving to manual driving). Namely, in the first stage that is the process stage following the switch notification detection, transition is made from repeating the expanded state BL and contracted state DE to the expanded state BL, in the second stage that promotes caution in the driver, transition is made to the contracted state DE. In the second stage, transition is made from the expanded state BL to a weakly contracted state DE since this is immediately prior to transition to manual driving by the driver. Then, when the transition is made to manual driving by the driver, information presentation by the rim 18 ends, the shape of the rim 18 is contracted, and transition is made to the standard state ST for manual driving.

Next, as illustrated in FIG. 5, at step 120, the control device 40 determines whether or not driving of the vehicle has completed based on, for example, whether or not the vehicle ignition is switched off. In a case in which negative determination is made at step 120, the control device 40 returns to step 102, and step 102 to step 118 are repeated until the determination of step 120 is affirmative. Moreover, in a case in which affirmative determination is made at step 120, the control device 40 ends the control processing illustrated in FIG. 5.

In the present exemplary embodiment, explanation has been given in which processing is performed by executing a program according to the flowchart illustrated in FIG. 5. However, the processing of the program may be implemented using hardware.

As explained above, in the present exemplary embodiment, in cases in which there is a switch from automatic driving to manual driving initiated by the driving assistance processing, and in cases in which there is a switch from manual driving by the driver to automatic driving using the driving assistance processing, information may be presented perceivable by the driver, since information is presented using expansion and contraction of the rim 18 of the steering wheel 10.

[Second Exemplary Embodiment]

Explanation next follows regarding a second exemplary embodiment. Since configuration in the second exemplary embodiment is similar to that in the first exemplary embodiment, the same reference numerals are allocated for similar configuration, and explanation thereof is omitted.

The present exemplary embodiment employs the present disclosure in a case in which information presentation is performed to the driver by changing the state of a rim 19 by causing a steering wheel 11 to oscillate.

Figure 10:
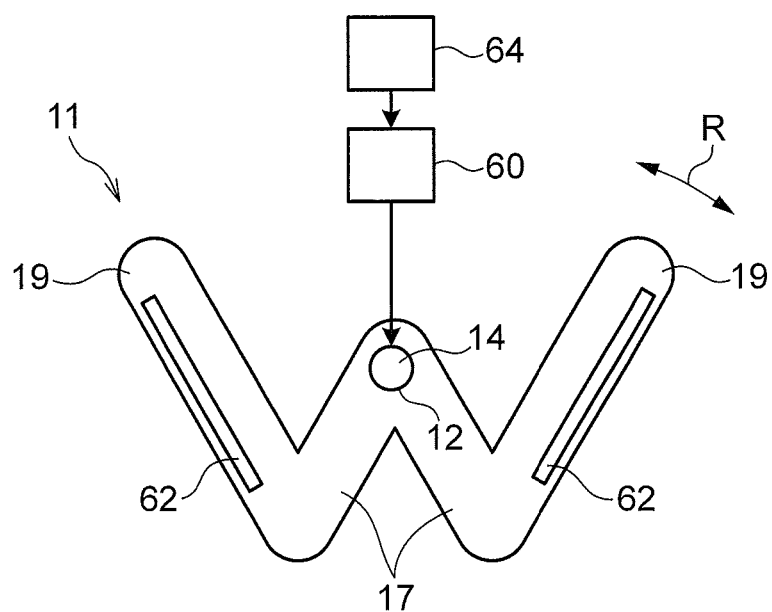
FIG. 10 is a block diagram illustrating a configuration of a steering wheel according to a second exemplary embodiment.

FIG. 10 illustrates an example of a configuration of the steering wheel 11 according to the present exemplary embodiment. The steering wheel 11 includes a boss 12, and the boss 12 is disposed at a central portion of the steering wheel 11. A vehicle rear side end (upper end) of a circular shaft shaped steering shaft 14, serving as an operation shaft, is fixed to the boss 12. The steering wheel 11 is capable of rotating as a unit with the steering shaft 14, with the steering shaft 14 serving as a central axis.

A steering driver 60 such as a motor is coupled to the steering shaft 14. The steering shaft 14 rotates about a central axis of the steering shaft 14 under driving by the steering driver 60, and the steering wheel 11 is rotationally driven in the arrow R direction in FIG. 10. A steering load setting section 64 is connected to the steering driver 60, and the steering load setting section 64 is capable of setting the steering load on the steering wheel 11 by being driven by the steering driver 60. In the present exemplary embodiment, the steering load is set high by the steering load setting section 64 when manual steering by the driver is unnecessary during automatic driving, and the steering load is set low by the steering load setting section 64 during manual driving.

A spoke section 17 is fixed to an end portion (upper end) of the steering shaft 14, and the spoke section 17 extends from the boss 12 toward the radial direction outside of the steering wheel 10, and is rotatable as a unit with the boss 12.

The rim 19, serving as a gripping section, is fixed to leading ends of the spoke section 17, and the rim 19 is rotatable as a unit with the boss 12 and the spoke section 17. The rim 19 is grippable in the hands of the driver, and in a state in which the rim 19 is gripped by the hands of the occupant, the steering shaft 14 is rotated to steer the vehicle by rotation operation of the steering wheel 11.

Grip detection sections 62 that detect gripping by the hands of the driver are provided to the rim 19.

Figure 11:
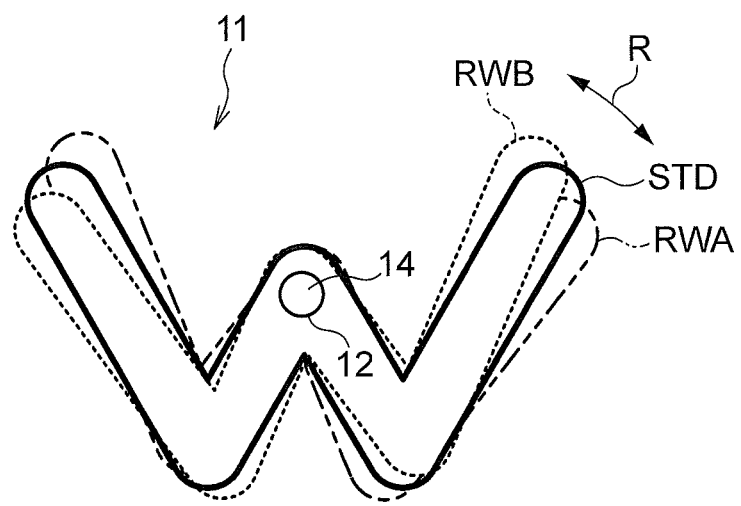
FIG. 11 is an explanatory diagram illustrating changes to a state of a rim according to the second exemplary embodiment.

FIG. 11 illustrates an example of a situation in which the steering wheel 11 is rotated and the state of the steering wheel 11 is changed due to being driven by the steering driver 60. Due to being driven by the steering driver 60, the steering wheel 11 switches to an oscillation state from a standard state STD. Namely, the steering wheel 11 is oscillated such that an oscillation state RWA in which the steering wheel 11 is transitioned by rotating the steering shaft 14 clockwise, and an oscillation state RWB in which the steering wheel 11 is transitioned by rotating the steering shaft 14 counterclockwise, are repeatedly switched between.

Figure 12:
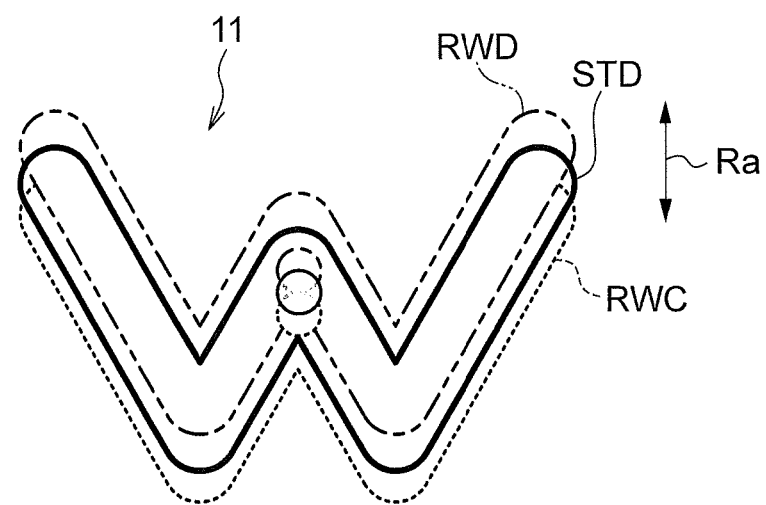
FIG. 12 is an explanatory diagram illustrating another example of changes to a state of a rim according to the second exemplary embodiment.

Although FIG. 11 illustrates a case in which the steering wheel 11 is oscillated by rotating the steering shaft 14, the oscillation is not limited to rotation of the steering shaft 14. For example, the steering driver 60 may be driven so as to drive to tilt the steering shaft 14. In such cases, as illustrated in FIG. 12, due to being driven by the steering driver 60, the steering wheel 11 is oscillated from the standard state STD during normal operation. Namely, the steering shaft 14 may cause the steering wheel 11 to oscillate so as to repeatedly switch between an oscillation state RWC of the steering wheel 11 transitioned to by tilting the steering shaft 14 toward the vehicle rear side, and an oscillation state RWB of the steering wheel 11 transitioned to by tilting the steering wheel 11 toward the vehicle front side.

Figure 13:
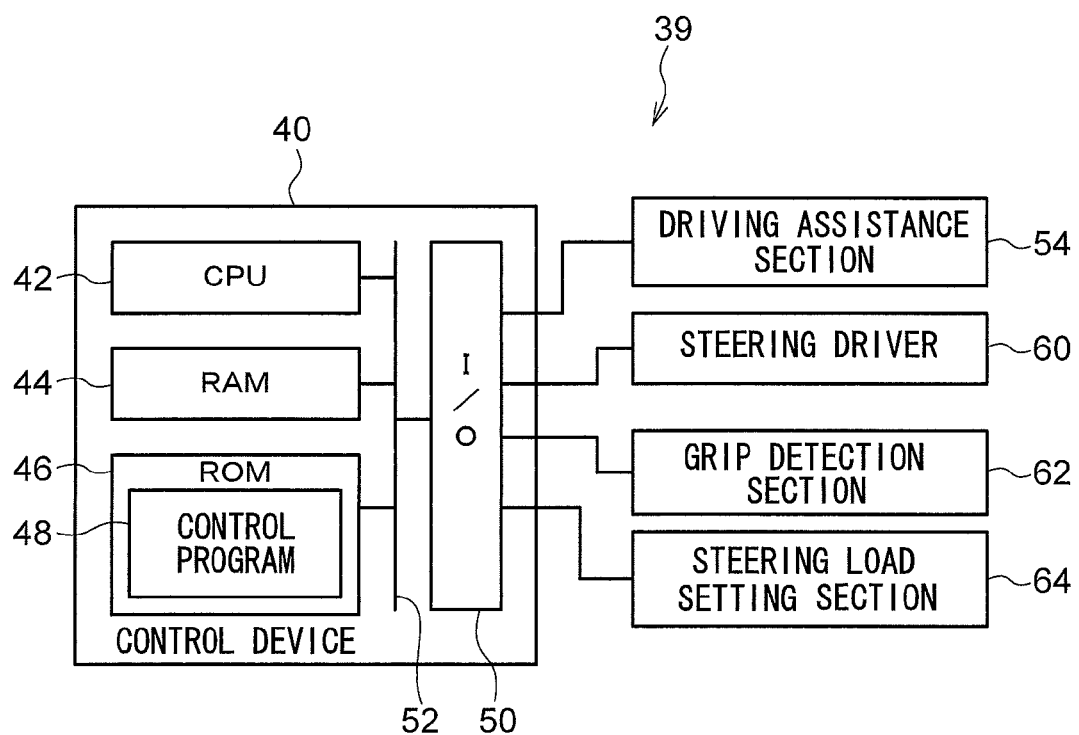
FIG. 13 is a block diagram illustrating a configuration of an on-board machine including a control device according to the second exemplary embodiment.

FIG. 13 illustrates an example of a configuration of an on-board machine that includes the control device 40 according to the present exemplary embodiment. As illustrated in FIG. 13, the control device 40 includes a CPU 42, RAM 44, ROM 46 that stores a control program 48, and an I/O 50 that are connected to one another through a bus 52. Moreover, the I/O 50 is connected to a driving assistance section 54, the steering driver 60, the grip detection section 62, and the steering load setting section 64.

The steering driver 60 is an example of a gripping section according to the present disclosure. Moreover, the grip detection section 62 is an example of a grip detection section according to the present disclosure, and the steering load setting section 64 is an example of a functional section that sets a steering load on a steering section according to the present disclosure.

Figure 14:
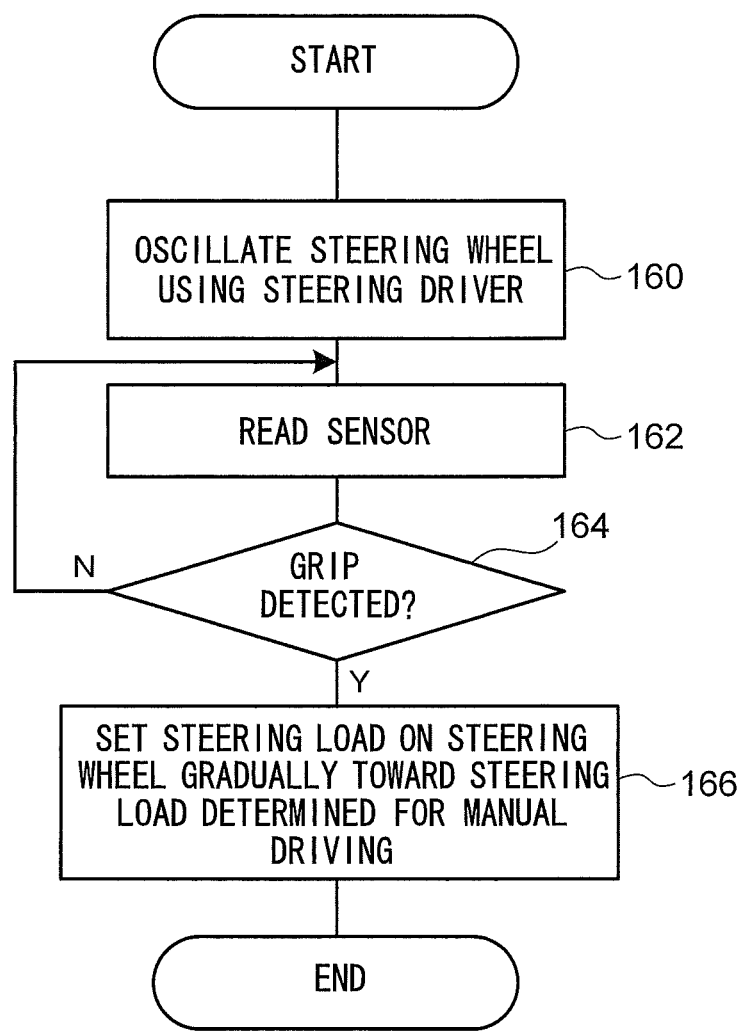
FIG. 14 is a flowchart illustrating a flow of control processing according to the second exemplary embodiment.

Explanation next follows regarding operation of the present exemplary embodiment with reference to the flowchart illustrated in FIG. 14. Note that in the present exemplary embodiment, explanation is given regarding control that oscillates the steering wheel 11 in a state prompting a transition from automatic driving to manual driving.

In a case in which information indicating a switch from automatic driving to manual driving during driving assistance is acquired from the driving assistance section 54 (when affirmative determination is made at step 116 illustrated in FIG. 5), the control device 40 controls the steering driver 60 instead of controlling the pumps and the switching valves (step 118 illustrated in FIG. 5). Namely, the steering driver 60 is controlled so as implement a state that prompts the switch from automatic driving to manual driving by the driver.

FIG. 14 illustrates an example of a flow of processing according to the present exemplary embodiment in the processing of step 118 illustrated in FIG. 5 in detail. First, at step 160, the control device 40 controls the steering driver 60 so as to implement a state that prompts the switch from automatic driving to manual driving by the driver. Namely, as illustrated in FIG. 11, the control device 40 drives the steering driver 60 in a state of repeatedly switching the steering wheel 11 between the oscillation state RWA and the oscillation state RWB. In this manner, information prompting the switch from automatic driving to manual driving may be perceived by the driver visually by oscillating the steering wheel 11.

Next, at step 162, the control device 40 reads the detection result from the grip detection section 62, and at the next step 164, determines whether or not the rim 19 is being gripped in the hands of the driver. In a case in which negative determination is made at step 164, the control device 40 returns to step 162, and stands by until affirmative determination is made at step 164. The control device 40 transitions processing to step 166 in a case in which affirmative determination is made at step 164.

At step 166, the steering load setting section 64 is controlled such that the steering load of the steering wheel 11 is gradually changed to a predetermined steering load setting for manual steering. Namely, the steering load setting section 64 is set so as to gradually lower the steering load from the steering load that was set high since manual steering by the driver is unnecessary during automatic driving, and the steering load is gradually transitioned to be appropriate for manual driving.

As explained above, in the present exemplary embodiment, in a case in which the switch is made from automatic driving to manual driving, information may be presented so as to be easily perceptible by the driver, since information is presented by oscillating the steering wheel 11.

Moreover, in the present exemplary embodiment, in a case in which the switch is made from automatic driving to manual driving, a preparation time for switching from automatic driving to manual driving may be presented perceptible by the driver, since the steering load is gradually transitioned to be appropriate for manual driving. Accordingly, unease felt by the driver in a case in which suddenly switching from automatic driving to manual driving may be suppressed, and a smooth transition may be made from automatic driving to manual driving.

Note that the processing performed by the control device 40 in the each of the above exemplary embodiments may, for example, be stored and distributed as a program on a storage medium.

What is claimed is:

1. A steering device, comprising:
an acquisition section that acquires specific information related to whether or not a driving assistance section, which performs driving assistance processing that assists driving of a vehicle by an occupant of the vehicle, is performing the driving assistance processing;
a gripping section that is grippable by the occupant of the vehicle, and that is configured to present a plurality of different occupant-perceptible information presentation states to the occupant, the plurality of occupant-perceptible information presentation states including a first information presentation state and a second information presentation state that is different from the first information presentation state; and
a controller that controls the gripping section, based on the specific information acquired by the acquisition section, to transition from the first information presentation state to the second information presentation state to indicate switching between the driving assistance processing performed by the driving assistance section and manual driving of the vehicle by the occupant.

2. The steering device of claim 1, wherein:
the first information presentation state indicates the manual driving of the vehicle by the occupant, and the second information presentation state indicates that the driving assistance processing is performed by the driving assistance section;
the acquisition section acquires, as the specific information, information indicating a switch from the manual driving of the vehicle by the occupant to the driving assistance processing performed by the driving assistance section; and
the controller controls the gripping section to transition from the first information presentation state to the second information presentation state to indicate the switch from the manual driving of the vehicle by the occupant to the driving assistance processing performed by the driving assistance section.

3. The steering device of claim 1, wherein:
the first information presentation state indicates the manual driving of the vehicle by the occupant, and the second information presentation state indicates that the driving assistance processing is performed by the driving assistance section;
the acquisition section acquires, as the specific information, information indicating a switch from the driving assistance processing performed by the driving assistance section to the manual driving of the vehicle by the occupant; and
the controller controls the gripping section to transition from the second information presentation state to the first information presentation state to indicate the switch from the driving assistance processing performed by the driving assistance section to the manual driving of the vehicle by the occupant.

4. The steering device of claim 1, wherein the controller controls the gripping section to present the different information presentation states by changing at least one of (i) a shape of the gripping section from a first shape to a second shape, (ii) a hardness of the gripping section that is gripped by the occupant from a first hardness to a second hardness, and (iii) an oscillating state of the gripping section from not oscillating to oscillating.

5. The steering device of claim 3, wherein:
the acquisition section further acquires information indicating that a transition has been made to the manual driving of the vehicle by the occupant; and
the controller causes a steering load on a steering section under manual steering by the occupant to be a predetermined specific value, when the acquisition section acquires the information indicating that the transition has been made to the manual driving of the vehicle by the occupant.

6. The steering device of claim 5, further comprising a grip detection section that detects that the gripping section has been gripped by the occupant, wherein the acquisition section acquires a detection result of the grip detection section as the information indicating that the transition has been made to the manual driving of the vehicle by the occupant.

7. A vehicle information presentation method, comprising:
acquiring specific information related to whether or not a driving assistance section, which performs driving assistance processing that assists driving of a vehicle by an occupant of the vehicle, is performing the driving assistance processing; and
controlling a gripping section of the vehicle, which is grippable by the occupant of the vehicle and that is configured to present a plurality of different occupant-perceptible information presentation states to the occupant, the plurality of occupant-perceptible information presentation states including a first information presentation state and a second information presentation state that is different from the first information presentation state, based on the acquired specific information, so that the gripping section transitions from the first information presentation state to the second information presentation state to indicate switching between the driving assistance processing performed by the driving assistance section and manual driving of the vehicle by the occupant.

8. The method of claim 7, wherein:
the first information presentation state indicates the manual driving of the vehicle by the occupant, and the second information presentation state indicates that the driving assistance processing is performed by the driving assistance section;
the acquiring acquires, as the specific information, information indicating a switch from the manual driving of the vehicle by the occupant to the driving assistance processing performed by the driving assistance section; and
the controlling controls the gripping section to transition from the first information presentation state to the second information presentation state to indicate the switch from the manual driving of the vehicle by the occupant to the driving assistance processing performed by the driving assistance section.

9. The method of claim 7, wherein:
the first information presentation state indicates the manual driving of the vehicle by the occupant, and the second information presentation state indicates that the driving assistance processing is performed by the driving assistance section;
the acquiring acquires, as the specific information, information indicating a switch from the driving assistance processing performed by the driving assistance section to the manual driving of the vehicle by the occupant; and
the controlling controls the gripping section to transition from the second information presentation state to the first information presentation state to indicate the switch from the driving assistance processing performed by the driving assistance section to the manual driving of the vehicle by the occupant.

10. The method of claim 7, wherein the controlling controls the gripping section to present the different information presentation states by changing at least one of (i) a shape of the gripping section from a first shape to a second shape, (ii) a hardness of the gripping section that is gripped by the occupant from a first hardness to a second hardness, and (iii) an oscillating state of the gripping section from not oscillating to oscillating.

11. The method of claim 9, further comprising:
acquiring information indicating that a transition has been made to the manual driving of the vehicle by the occupant; and
causing a steering load on a steering section under manual steering by the occupant to be a predetermined specific value, upon acquiring of the information indicating that the transition has been made to the manual driving of the vehicle by the occupant.

12. The method of claim 11, further comprising:
detecting that the gripping section has been gripped by the occupant; and
acquiring a detection result that the gripping detection section has been gripped by the occupant as the information indicating that the transition has been made to the manual driving of the vehicle by the occupant.

13. A non-transitory computer readable medium storing a vehicle information presentation program that causes a computer to execute processing, the processing comprising:
acquiring specific information related to whether or not a driving assistance section, which performs driving assistance processing that assists driving of a vehicle by an occupant of the vehicle, is performing the driving assistance processing; and
controlling a gripping section of the vehicle, which is grippable by the occupant of the vehicle and that is configured to present a plurality of different occupant-perceptible information presentation states to the occupant, the plurality of occupant-perceptible information presentation states including a first information presentation state and a second information presentation state that is different from the first information presentation state, based on the acquired specific information, so that the gripping section transitions from the first information presentation state to the second information presentation state to indicate switching between the driving assistance processing performed by the driving assistance section and manual driving of the vehicle by the occupant.

14. The non-transitory computer readable medium of claim 13, wherein:
the first information presentation state indicates the manual driving of the vehicle by the occupant, and the second information presentation state indicates that the driving assistance processing is performed by the driving assistance section;
the acquiring acquires, as the specific information, information indicating a switch from the manual driving of the vehicle by the occupant to the driving assistance processing performed by the driving assistance section; and the controlling controls the gripping section to transition from the first information presentation state to the second information presentation state to indicate the switch from the manual driving of the vehicle by the occupant to the driving assistance processing performed by the driving assistance section.

15. The non-transitory computer readable medium of claim 13, wherein:

the first information presentation state indicates the manual driving of the vehicle by the occupant, and the second information presentation state indicates that the driving assistance processing is performed by the driving assistance section;

the acquiring acquires, as the specific information, information indicating a switch from the driving assistance processing performed by the driving assistance section to the manual driving of the vehicle by the occupant; and the controlling controls the gripping section to transition from the second information presentation state to the first information presentation state to indicate the switch from the driving assistance processing performed by the driving assistance section to the manual driving of the vehicle by the occupant.

16. The non-transitory computer readable medium of claim 13, wherein the controlling controls the gripping section to present the different information presentation states by changing at least one of (i) a shape of the gripping section from a first shape to a second shape, (ii) a hardness of the gripping section that is gripped by the occupant from a first hardness to a second hardness, and (iii) an oscillating state of the gripping section from not oscillating to oscillating.

17. The non-transitory computer readable medium of claim 15, wherein the processing further comprises:

acquiring information indicating that a transition has been made to the manual driving of the vehicle by the occupant; and causing a steering load on a steering section under manual steering by the occupant to be a predetermined specific value, upon acquiring of the information indicating that the transition has been made to the manual driving of the vehicle by the occupant.

18. The non-transitory computer readable medium of claim 17, wherein the processing further comprises:

detecting that the gripping section has been gripped by the occupant; and acquiring a detection result that the gripping detection section has been gripped by the occupant as the information indicating that the transition has been made to the manual driving of the vehicle by the occupant.

* * * * *